(No Model.)

R. MOTZNIK.
SAW TOOTH.

No. 557,414. Patented Mar. 31, 1896.

Witnesses,
J Stevens
E. A. M. Tibbitts

Inventor,
Rudolf Motznik,
By his Atty Geo. W. Tibbitts.

UNITED STATES PATENT OFFICE.

RUDOLF MOTZNIK, OF CLEVELAND, OHIO.

SAW-TOOTH.

SPECIFICATION forming part of Letters Patent No. 557,414, dated March 31, 1896.

Application filed September 27, 1895. Serial No. 563,923. (No model.)

*To all whom it may concern:*

Be it known that I, RUDOLF MOTZNIK, a citizen of the United States, residing at Cleveland, in the county of Cuyahoga and State of Ohio, have invented certain new and useful Improvements in Saw-Teeth, of which the following is a specification.

This invention relates to saw-teeth; and it consists in the peculiar construction of the tooth and its combination with the saw-plate, substantially as hereinafter described, and pointed out in the claim.

Figure 3:
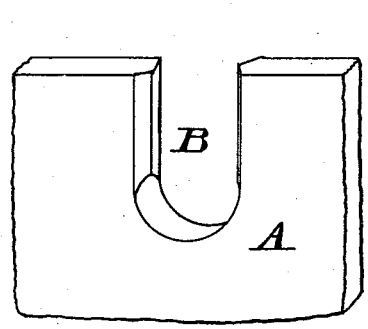
Figure 2:
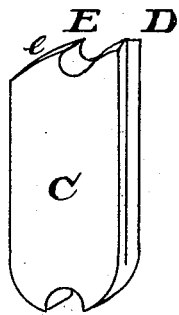
Figure 1:
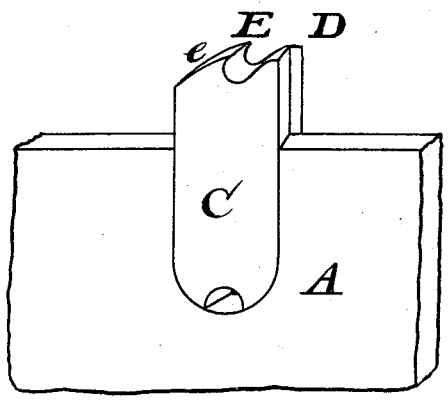

In the accompanying drawings, Figure 1 is a side view of the tooth as seen set in the blade. Fig. 2 is a detached perspective view of the tooth. Fig. 3 is a view of a portion of a saw-blade, showing slot or seat for the tooth.

The invention consists in providing a simple insertible saw-tooth, designed principally for sawing metal, having two cutting edges, the first or advance cutting edge adapted for side cutting, the second for clearing, the two teeth operating as hereinafter shown and described.

A represents a piece of a saw-blade, which may be a circular or straight saw.

B is a groove made in the blade for holding the tooth, having straight sides and a round bottom. In the sides of the groove are made V-shaped ribs.

C is the tooth, having straight sides and a rounded end. In the side edges of the tooth are made V-shaped grooves.

D is the leading cutting edge formed by a cross-groove E and the V-groove in the edge of the body of the tooth, whereby the points and the side edges of said V-groove form side cutting edges. The clearing-cutter is formed by the cross-groove E and the rounded corner $e$ of the body of the tooth.

The sides of the groove B and the edges of the tooth are made slightly tapering, so that when the tooth is forcibly inserted it will be wedged in tight enough to hold.

The working of this tooth is such that the points and cutting edges D, being in advance, cut the sides of the kerf first and then the clearing-cutter following cuts a very smooth kerf.

Having described my invention, what I claim, and desire to secure by Letters Patent, is—

The combination with the saw-blade A, having the ribbed recesses B B, of the teeth consisting of the blades C C, the V-shaped grooves in the side edges of said blades, the forward groove forming the leading side cutters, the clearing-cutters formed by notch E, presenting an outer edge extending in a straight line across from side to side of the tooth, as shown and described.

RUDOLF MOTZNIK.

Witnesses:
   GEO. W. TIBBITTS,
   W. L. WEST.